Figures 1, 2, 3:
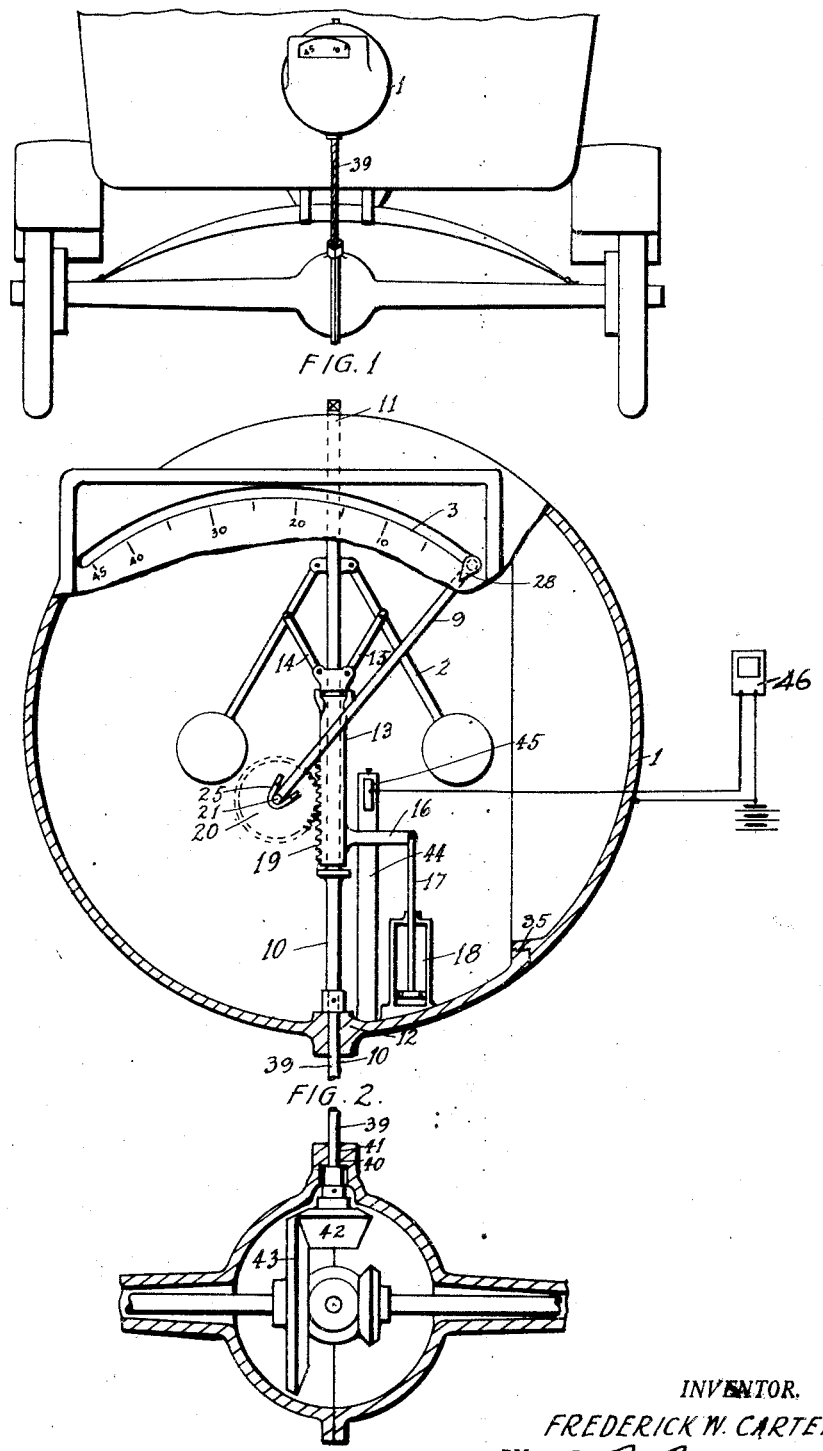

March 11, 1924.

F. W. CARTER

VEHICLE SPEED INDICATOR

Filed Nov. 28, 1921     2 Sheets-Sheet 1

1,486,227

INVENTOR.
FREDERICK W. CARTER
BY
ATTORNEY

March 11, 1924.
F. W. CARTER
VEHICLE SPEED INDICATOR
Filed Nov. 28, 1921   2 Sheets-Sheet 2
1,486,227
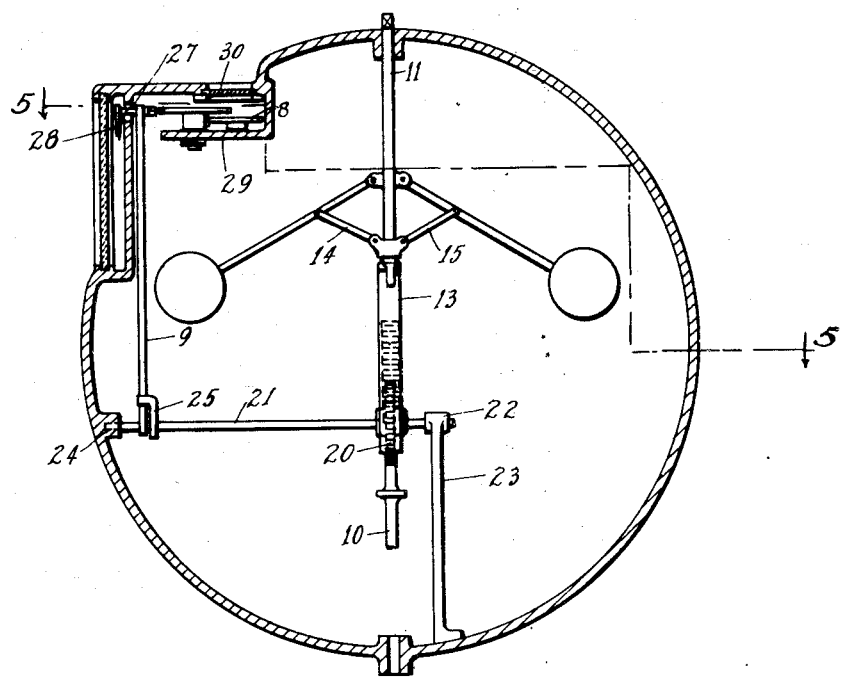
FIG. 4.
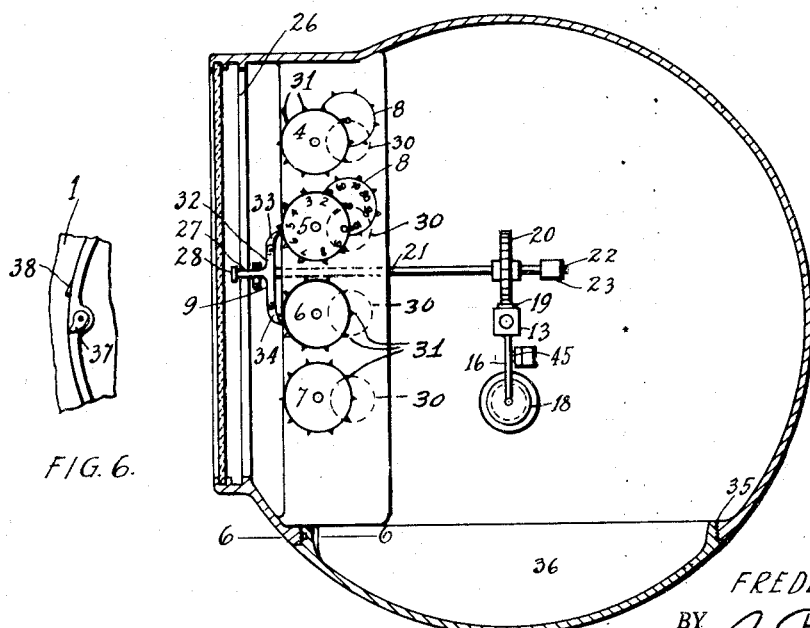
FIG. 6.
FIG. 5.
INVENTOR.
FREDERICK W. CARTER
BY
A.B.Bowman
ATTORNEY.

Patented Mar. 11, 1924.

1,486,227

UNITED STATES PATENT OFFICE.

FREDERICK W. CARTER, OF LEMON GROVE, CALIFORNIA.

VEHICLE SPEED INDICATOR.

Application filed November 28, 1921. Serial No. 518,179.

*To all whom it may concern:*

Be it known that I, FREDERICK W. CARTER, a citizen of the United States, residing at Lemon Grove, in the county of San Diego and State of California, have invented a certain new and useful Vehicle Speed Indicator, of which the following is a specification.

My invention relates to speedometers or speed indicators more particularly for automobiles; and some of the objects of my improvements are: to record the maximum speed at which an automobile has been traveling; to provide an instrument which shall record the maximum speed at which an automobile has been traveling and the number of times it has attained such speed; to provide such an instrument which may be mounted on the conventional automobile, which is enclosed and may be locked and cannot be tampered with; to provide such an instrument that is not materially affected by jar, shock or vibration of the vehicle; that is simple of construction, accurate in operation, durable and that will not easily get out of order.

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a face view in elevation of the indicator mounted on the rear of an automobile; Fig. 2 is a vertical view with the front of the case of the instrument partly broken away; Fig. 3 is a detail view of the differential gear of an automobile, the rear portion of the differential case being removed; Fig. 4 is a sectional elevational view, a side of the case being removed; Fig. 5 is a sectional view, taken through 5—5 of Fig. 4; and Fig. 6 is a detail view of a pawl for locking the casing cap, through 6—6 of Fig. 5.

Similar reference characters refer to similar parts and portions throughout the several views of the drawings.

The main parts of my invention are, a case 1, a governor 2, a dial 3, registering dials 4, 5, 6, 7 and 8 and an arm 9 operatively connecting governor 2 with the dials.

The case 1 which contains or houses the mechanism of my indicator, is formed preferably of sheet metal and provided with a locked cap to prevent tampering with the indicator mechanism by anyone without authority.

A shaft 10 is mounted in the case 1 in journal bearings 11 and 12. The fly-ball governor 2 is mounted on the shaft 10 and is rotated thereby. A sleeve 13 is mounted to slide longitudinally on the shaft 10 and is connected at its upper end with the arms of governor 2 by toggles, 14 and 15 so that it is raised when the balls of the governor spread on account of rotation. The sleeve 13 is provided with an arm 16 which in turn is connected with a piston rod 17 of a dashpot 18. A gear rack 19 is mounted on the sleeve 13. A gear 20 is mounted to mesh with a rack 19 on a transverse shaft 21 and is actuated by the governor 2. The shaft 21 is mounted in a journal bearing 22 on a stand 23 at one end and in a journal bearing 24 mounted in case 1 at its opposite end.

Near the outer end of the shaft 21 arm 9 is loosely mounted thereon and a slotted driving dog 25 is rigidly mounted on the shaft contiguous thereto. The slotted driver of dog 25 loosely straddles the base of arm 9 and engages the arm in either direction of its motion with slight play, actuating the indicator arm 9 to indicate the speed attained by the automobile. The dash pot 18 prevents hysterical motion of the indicator arm due to jolting of the machine.

The upper part of the face of case 1 is provided with the arcuate dial 3. In this is formed an arcuate slot 26. An index post 27 is mounted in the free end of indicator arm 9 which passes through and travels in slot 26. Upon this is mounted the index finger 28 which travels over the dials 3 to indicate the current speed of the machine.

In the upper part of case 1, back of dial 3 are mounted dials 4, 5, 6, 7 and 8, upon a horizontal plate 29. These are surmounted by a window 30 in the cover of case 1. Dials 4—7 are arranged in the arc of arm 9 and consist of disks pivotally mounted and suitably imprinted on their faces and provided with teeth 31 on their perimeters. The free end of indicator arm 9 is provided with a head 32 in which are mounted spring controlled ratchets 33 and 34 which engage and rotate dials 4—7 as the finger 28 moves on 3. Dials 4, 5, 6, and 7 are independent of one another, but a dial 8 is connected with each of these for the purpose of indicating the number of times they have been operated.

A screw-threaded hand-hole, 35, is formed in the bottom of case 1 and this is provided with a threaded plug 36, which is provided with a ratchet pawl 37. The wall of hand-pole 35 is formed with detent notches, 38, which lock plug 36 in the hand-hole. The pawl 37 and detent notches 38 are inaccessible, so that the plug, when once inserted can not be removed. This arrangement prevents resetting or tampering with the indicator mechanism.

My indicator thus described is operatively connected with the running gear of the automobile by means of a flexible shaft 39.

A shaft 40, is mounted in a journal bearing 41, provided in the differential case of the automobile. A pinion 42, is mounted on shaft 40 so as to mesh with the bevel gear 43.

Flexible shaft 39 is attached to shaft 10 through with governor 2 is driven.

As the speed of the automobile is increased the balls of governor 2 fly apart and upward on their levers, pulling on toggles 14 and 15 and sliding sleeve 13 upward. This action through rack 19 and segment 20, causes arm 9 and finger 28 to sweep toward the left. Pawl 33 engages successively a tooth 31 on the 30, the 35, the 40 and the 45 mile dial or dials 7, 6, 5, 4 and swings them around to such a position that the numbers appear through their respective windows in case 1. If the machine is traveling 45 miles per hour all the dials will show. If the machine has exceeded the speed limit the speed cop may ride up behind, observe the fact and arrest the driver. If the speed limit has not been exceeded, the indicator will show it and the driver is permitted to drive on. As the speed is reduced lever 9 moves to the right, pawl 33 engages teeth 31 of the dials in its path and returns them to blank position. Only the dial indicating the greatest speed attained will remain in indicating position. Thus the maximum speed attained will be shown even if the machine has slowed down, and the officer may observe that the limit has been exceeded.

The dials 8 will indicate the number of times the limit has been exceeded.

Mounted in said casing 1 is a standard 44 adjacent the arm 16 which is provided with a spring contact 45 which is engaged by the arm 16 when it raises sufficiently for closing a circuit and operating the buzzer 46 which may be positioned in close proximity to the driver thus providing an audible signal to the driver when he has reached a certain predetermined speed.

The police department or some one having the authority alone can open and reset the indicator.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

From the foregoing description it is obvious that my indicator will indicate the maximum speed at which an automobile upon which it is mounted has been traveling and that the register indicated can not be changed by any one not having authority to do so; that the speed is accurately determined; that the number of times the speed is exceeded will be registered; that the indicator is durable and will not easily get out of order. Furthermore it will be seen that a driver is not liable to be arrested through error of an officer and that much litigation, expense and loss of time may be prevented by the use of my invention.

Having thus described my invention, what I claim as new and desire to secure by Letters Patent is:

1. A speed indicator for vehicles, including a case, a shaft journalled in said case, a centrifugal governor operatively connected with said shaft, a radial indicator arm operatively connected with said governor, dials mounted in a series in said case, and pawls mounted at the extended end of said radial arm so as to engage and actuate said dials.

2. A speed indicator for vehicles, including a case, a shaft journalled in said case, a centrifugal governor operatively connected with said shaft, a radial indicator arm operatively connected with said governor, an arcuate dial in connection with the extended end of said radial arm, dials mounted in a series in said case, and pawls mounted at the extended end of said radial arm so as to engage and actuate said dials.

3. A speed indicator for vehicles, comprising a case formed with means for mounting on an automobile, a shaft journalled in said case, a centrifugal governor mounted on said shaft and operated thereby, a sleeve slidably mounted on said shaft and connected with said governor, a gear rack mounted on said sleeve, a radial indicator arm mounted in said case, an arcuate dial in connection with the extended end of said radial arm, a gear segment mounted to mesh with said rack, ratchet pawls mounted on the free end of said indicator arm, indicator dials rotatably mounted in said case in a series in the path of said pawls and imprinted with indicator characters, and ratchet teeth formed on said dials corresponding to said pawls and in operative relation thereto.

4. A speed indicator for vehicles, comprising a case formed with means for mounting on an automobile, a shaft journalled in said case, a centrifugal governor mounted on said shaft and operated thereby, a sleeve slidably mounted on said shaft and connected with said governor, a gear rack mounted on said sleeve, a radial indicator arm mounted in said case, an arcuate dial in connection with the extended end of said radial arm, a gear segment mounted to mesh with said rack, ratchet pawls mounted or the free end of said indicator arm, indicator dials rotatably mounted in said case in a series in the path of said pawls and imprinted with indicator characters, and ratchet teeth formed on said dials corresponding to said pawls and in operative relation thereto and other indicator dials in operative connection with said first mentioned indicator dials for further registering the number of times certain speeds are attained.

In testimony whereof, I have hereunto set my hand at San Diego, California, this 18th day of November, 1921.

FREDERICK W. CARTER.